United States Patent [19]
Blackford et al.

[11] 4,422,673
[45] Dec. 27, 1983

[54] PIPE COUPLINGS

[75] Inventors: John E. Blackford; John J. Kelly, both of Coventry; Philip A. Baker, Solihull, all of England

[73] Assignee: Lucas Industries Limited, Birmingham, England

[21] Appl. No.: 269,408

[22] Filed: Jun. 3, 1981

[30] Foreign Application Priority Data

Jun. 4, 1980 [GB] United Kingdom ............... 8018262

[51] Int. Cl.³ .............................................. F16L 55/00
[52] U.S. Cl. .................................... 285/23; 285/322; 285/379; 285/DIG. 22
[58] Field of Search ............... 285/322, 323, 379, 23, 285/DIG. 22

[56] References Cited

U.S. PATENT DOCUMENTS 4,138,145  2/1979  Lawrence ........................... 285/23

FOREIGN PATENT DOCUMENTS

| 2458473 | 7/1975 | Fed. Rep. of Germany | 285/23 |
| 2554827 | 7/1976 | Fed. Rep. of Germany | 285/379 |
| 2754055 | 4/1979 | Fed. Rep. of Germany | 285/23 |
| 7802712 | 9/1979 | Netherlands | 285/23 |
| 1464267 | 12/1973 | United Kingdom | |

*Primary Examiner*—Dave W. Arola
*Attorney, Agent, or Firm*—Ferguson, Baker, Whitham, Spooner & Kroboth

[57] ABSTRACT

A pipe coupling includes a nut in which a collet, a back-up member and an anti-extrusion washer are retained by means of an axially split ring which is detachably engageable in a peripheral groove in the back-up member and engaged in a recess in the nut. The anti-extrusion washer has an extrusion press fitted into the member. This construction permits the various parts to be easily assembled into the nut without the risk of damaging the ring or the screw-threading in the nut.

12 Claims, 3 Drawing Figures

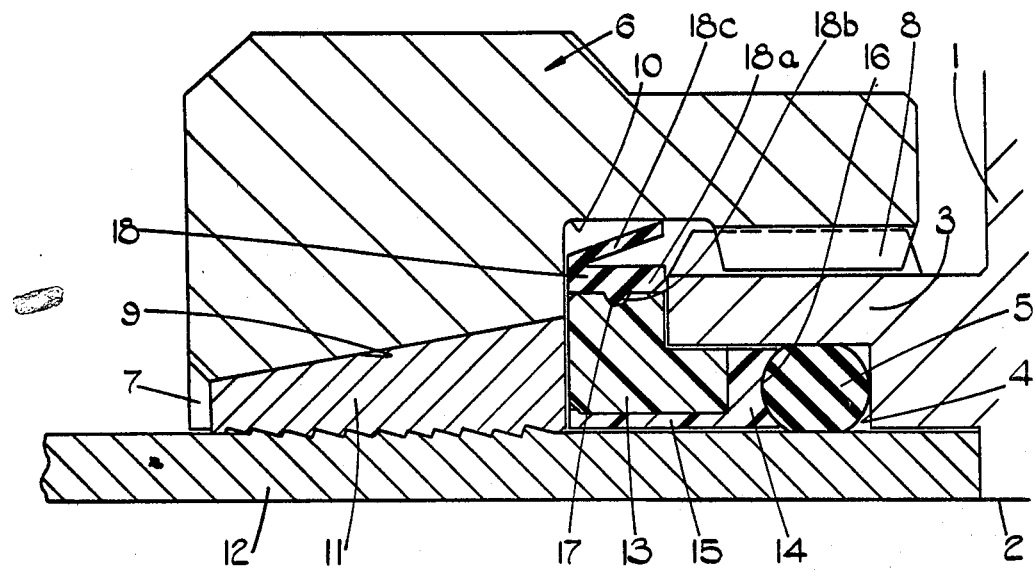
FIG. 1.
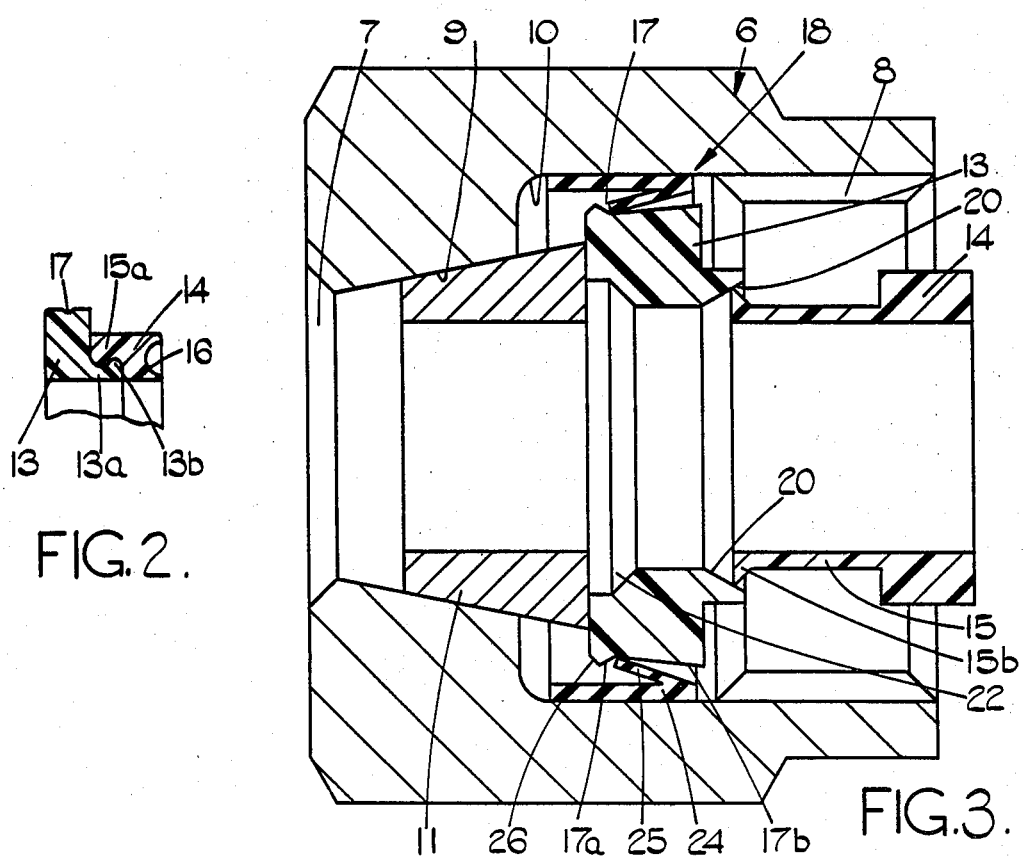
FIG. 2.
FIG. 3.

PIPE COUPLINGS

This invention relates to pipe couplings and is more particularly concerned with pipe couplings having a nut into which is preassembled a pipe-gripping collet, a thrust washer (or back-up member), and a backing ring (or anti-extrusion washer) engaging, in use, against an O-ring which effects a seal between the pipe and a fitting with which the nut is engaged.

It has been proposed in British patent specification No. 1,522,203 to provide such a pipe coupling and to retain the assembly of collet, back-up member and anti-extrusion washer in the nut by providing the back-up member with a resiliently deformable flange which surrounds the outer periphery of the back-up member and which is thermally bonded thereto. In its relaxed state, the external diameter of the peripheral, resiliently deformable flange is approximately equal to the trough diameter of the threaded portion of the bore of the nut. The anti-extrusion washer is also bonded to the back-up member. In manufacturing the assembly, the collet is placed into the bore of the nut and the back-up member is passed down the bore. During this stage, the peripheral resiliently deformable flange is deformed inwardly so as to permit it to pass the crests of the threaded portion of the nut. The above form of construction has the disadvantage that it is relatively expensive to manufacture because the deformable flange is required to be thermally bonded to the periphery of the back-up member. Additionally, there is the risk that, in forcing the assembly of back-up member, flange and anti-extrusion washer along the nut, some of the material of the flange will be abraded away so that particles are produced which could ultimately adversely affect the sealing efficiency of the coupling.

According to the present invention, there is provided a pipe coupling having a nut in which a pipe-engageable collet, a back-up member, and an anti-extrusion member are retained by means of a ring which is at least partly resiliently deformable and which is detachably engageable with a peripheral groove in the back-up member.

In a highly preferred embodiment, the deformable ring is axially split to facilitate its fitting and takes the form of a ring having an internal rib for engagement in the groove and an outwardly extending barb portion.

With the above form of construction, the ring is inserted into the bore in the nut and then the collet, the back-up member and the anti-extrusion washer are inserted into the nut until the groove is aligned with the ring which then engages with the groove to retain the back-up member in the nut. This form of construction is economical to manufacture since no thermal bonding of the ring to the back-up member is required and there is little risk of damage to the ring during its installation or during assembly or dismantling of the coupling, but if damage to the ring does occur it can be easily replaced.

In one embodiment, the ring comprises an annular band having an internal annular rib and having the barb portion integrally joined to one axial end thereof, said barb portion being a frusto-conical annulus with the base of the annulus spaced radially outwardly of the external surface of the band.

In another embodiment, the ring comprises an annular band having a frusto-conical annular portion integrally joined at one of its axial ends to the band and projecting inwardly of the band so that its other axial end is engaged in the peripheral groove in the back-up member. The peripheral groove in the back-up member may have a generally V-shaped section. A collet-adjacent end of the back-up member may have a peripheral chamfer thereon to assist in insertion part the portion of the ring which is engaged in the groove.

The cross-sectional dimensions of the ring will usually remain constant over the range of coupling sizes as will the peripheral groove in the back-up member.

Conveniently, the anti-extrusion washer is provided with a sleeve which is press-fitted into the back-up member so as to secure the washer and member together.

An embodiment of the present invention will now be described, by way of example, with reference to the accompanying drawings in which:

FIG. 1 is an axial section through part of one embodiment of a pipe coupling according to the present invention, FIG. 2 is an axial section showing a modification of the coupling of FIG. 1, and FIG. 3 is an axial section through part of another embodiment of pipe coupling according to the present invention.

Referring to FIG. 1, the pipe coupling basically comprises a connector body 1 (for example, a pipe connector body) which is only partly shown and which has a bore 2 therethrough. The connector body 1 is provided with an integral, externally screw-threaded sleeve 3 whose interior is aligned, and in communication, with the bore 2. The interior of the sleeve 3 is stepped to provide an annular abutment surface 4 for an O-ring seal 5. The pipe coupling also comprises a nut 6 having a bore 7 therethrough. The bore 7 has a screw-threaded portion 8 at one end thereof and a frusto-conical portion 9 at the other end thereof. The frusto-conical portion 9 tapers inwardly towards the end of the nut 6 opposite the screw-threaded portion 8. Between the portions 8 and 9 there is provided an undercut or annular recess 10. The undercut or recess 10 is about twice as long as the usual type of undercut which is provided to enable a thread-cutting tool to be operated. The pipe coupling further includes a pipe-gripping collet 11 which is axially split (the axial split is not shown in the section taken) and which is internally serrated to grip a pipe 12 in use. The external surface of the collet 11 is of frusto-conical form to mate with the frusto-conical portion 9 of the nut 6. The pipe coupling further comprises an annular back-up member 13 formed of metal and an anti-extrusion washer 14 formed of nylon. The anti-extrusion washer 14 has an integral sleeve 15 which is press-fitted into the back-up member 13 so as to be secured thereto. The free end of the sleeve 15 is flared so as to snap fit into a corresponding flare in the central opening through the annular back-up member 13. In the modification shown in FIG. 2, instead of being provided with the sleeve 15, the anti-extrusion washer 14 is provided with an integral sleeve 15a which is a snap-fit around a sleeve 13a which is integral with the back-up member 13 and which has an integral outwardly projecting annular rib 13b. The anti-extrusion washer 14 is provided with an annular recess 16 in its end facing the O-ring 5, i.e. in its end remote from the back-up member 13. The O-ring 5 enters the annular recess 16 and, in use, is prevented by the washer 14 from extruding, under the action of internal pressure in the pipe coupling, past the back-up member 13. The back-up member 13 is of L-shaped cross-section and projects radially outwardly beyond the inner wall of the sleeve 3 but terminates radially inwardly of the troughs of the screw-threading on the sleeve 3. In its outer periphery the back-up member 13 is provided with an annular groove 17 of truncated V-shaped cross-section (see FIG. 1). An axially split nylon ring 18 is detachably engaged in the groove 17 and is disposed within the annular recess 10. The ring 18 consists of an annular band 18a having, integral therewith, an internal annular rib 18b which is, like the groove 17, of truncated V-shaped cross-section, and a barb portion 18c. The barb portion 18c is of frusto-conical annular form and extends from one end of the band 18a so that the base of the frusto-cone is spaced outwardly from the outer surface of the band 18a by a distance of 0.4 mm and is in alignment with the opposite end of the band 18a. The base of the frusto-cone faces the screw-threaded portion 8. The cross-sectional size of the ring 18 and the groove are the same irrespective of the diameter of the coupling, only the diameters thereof alter with the diameter of the coupling. The depth and width of the groove 17 are 0.4 mm and 1.0 mm respectively and the rib 18b is of the same dimensions. The length and thickness of the band 18a are 2.5 mm and 0.5 mm respectively and the length and thickness of the barb portion 18c are 2.6 mm and 0.3 mm respectively. The included angle between the band 18a and the barb portion 18c is 12 degrees.

The maximum diameter of the barb portion 18c is equal to the diameter of the base of the annular recess 10 so that it is readily uncompressed when in the recess 10. Diametral tolerances for the back-up member 13, ring 18, and recess 10 are such that there is always contact existing between the three members. The ring 18 is axially split to facilitate its assembly into the nut 6.

It will be appreciated from the above that the ring 18 prevents the back-up member 13 from becoming detached from the nut 6 when the latter is not engaged with the sleeve 3. Since the back-up member 13 is prevented from disengagement from the nut 6, the anti-extrusion washer 14 is also held against disengagement as is the collet 11 which can only be withdrawn from the nut 6 after removal of the back-up member 13.

The collet 11, back-up member 13 and anti-extrusion washer 14 are assembled into the nut 6 by placing the nut 6 on a horizontal surface with the threaded portion 8 of the bore 7 uppermost. The ring 18 is inserted into the nut 6 so as to engage the recess 10. The collet 11 is then dropped into the nut 6 followed by the back-up member 13 after the anti-extrusion washer 14 has been fitted thereto. Using a simple press tool (not shown) engaging the back-up member 13, the collet 11, the back-up member 13 and the washer 14 are urged into the nut 6 until the collet 11 engages the frusto-conical portion 9 of the nut 6 and the rib 18b of the ring 18 lies opposite the annular groove 17. At this stage, the rib 18b enters the groove 17 so that the member 13 is thus held in position within the nut 6 whereby the collet 11 and the washer 14 are retained in the nut 6. On removal of the press tool, the collet 11 will tend to move out of engagement with the frusto-conical portion 9 and this movement is permitted because the extended length of the recess 10 accommodates movement of the ring 18 which is now engaged with the back-up member 13. Attachment of the pipe coupling to the pipe 12 involves sliding the assembly of nut 6, collet 11, back-up member 13 and anti-extrusion washer 14 and then the O-ring 5, onto the pipe 12 which is then inserted into the sleeve 3 until it abuts against an internal abutment surface 20 in the bore 2. The nut 6 causes the collet 11 to contract radially inwardly as permitted by its axial split, as a result of interaction between the mating frusto-conical surfaces in the nut 6 and on the collet 11.

When it is desired to dismantle the coupling, the nut 6 is unscrewed and, if the collet 11 has bitten sufficiently into the surface of the pipe 12 to be fixed to the latter, the action of unscrewing the nut 6 causes the side wall of the recess 10 adjacent the screw-threaded portion 8 to abut against the ring 18 and roll it out of the recess 17 so that the screw-threaded portion 8 is free to be withdrawn past the back-up member 13. The ring 18 can then be readily removed from the nut 6 in preparation for remaking of the coupling. This assembly is economical to manufacture, is easy to use and there is little risk in material from the ring 18 being abraded away during assembly or dismantling of the coupling. Also, in the unlikely event that the ring 18 is damaged when dismantling the coupling, it can be economically and simply replaced with another ring without the need to replace the back-up member and anti-extrusion washer.

Referring now to FIG. 3 of the drawings, the coupling illustrated therein is similar to that of FIG. 1 and similar parts are accorded the same reference numerals. In this embodiment, the back-up member 13 has a frusto-conical lead-in 20 to assist in inward flexing of the integral sleeve 15 of the anti-extrusion washer 14. In FIG. 3, washer 14 is shown in a position just prior to snap-fitting of the sleeve 15 into the back-up member 13. When fitted, outwardly flared portion 15b of sleeve 15 is engaged in a correspondingly tapered recess 22 at the opposite axial end of member 13 to the lead-in 20. The annular groove 17 is of shallow V-shaped configuration, with a collet-adjacent side 17a of the groove being disposed at a greater angle with respect to the axis of the coupling than the collet-remote side 17b thereof.

The axially split ring 18 is formed of an outer annular band 24 and an inwardly directed frusto-conical portion 25 which extends integrally from one axial end of the band 24. The inner axial end of the frusto-conical portion 25 is engaged in the groove 17. The inclination of the side 17a of the groove 17 retains the back-up member 13 against unwanted disengagement from the ring 18 but permits disengagement when a suitably great withdrawal force is applied to the member 13. The inclination of the side 17b ensures that the member 13 is retained in the desired axial position.

During assembly, first the ring 18 is fed into the nut 6 until the band 24 enters the groove 10, then the collet 9 is dropped into the bore 7. Afterwards, the member 13 is passed along the bore 7 until it engages against the portion 25 of the ring 18. Further movement of the member 13 causes the portion 25 to be deflected outwardly (such deflection is facilitated by the provision of a peripheral chamfer 26 on the collet-adjacent end of the member 13 and by the direction of taper of frusto-conical portion 25 until the inner end of the portion 25 lies opposite the groove 17 whereupon it deflects back to engage in the groove 17. Axial movement of the member 13 is preferably effected by applying pressure thereto via the anti-extrusion washer 14 which will be in the position shown in FIG. 3. Once the portion 25 of the ring 18 is engaged in the groove 17, further axial pressure on the washer 14 causes the sleeve 15 to be deflected inwardly until the outwardly flared portion 15b thereof is engaged in the recess 22 so that the washer 14 is snap-engaged with the member 13.

As can be seen from FIG. 3, the groove 17 is offset from the mid-portion of the back-up member 13 towards the collet-adjacent end of the latter. The side 17b of the groove extends all the way to the collet-remote end of the member 13. Also, the free inner end of the portion 25 of the ring 18 is disposed approximately mid-way along the axial length of the ring 18. Because of this and because of the offset disposition of the groove 17 on the member 13, the recess 10 need not be as long as the recess 10 in embodiment of FIG. 1.

The pipe coupling of FIG. 3 is easier to produce, assemble and dismantle than the coupling of FIG. 1.

What is claimed is:

1. A pipe coupling comprising:
   body means including an externally screw-threaded sleeve, for receiving an end of a pipe and for receiving a sealing ring engageable between the body and the pipe;
   a nut having a bore therethrough for receiving the pipe, said nut including threaded means, at one end of said bore, for engaging said externally screw-threaded sleeve, said nut further including a tapered portion at an other end of said bore, said tapered portion tapering inwardly towards said other end of said bore, said nut further including a recess in an intermediate portion of said bore;
   pipe-gripping collet means, disposed in said nut, said collet means including a tapered external surface means for engaging said tapered portion of said bore, said tapered external surface means tapering inwardly towards said other end of said bore, said collet means further including an internal surface means for engaging an external surface of the pipe and gripping the pipe as a result of relative movement between said nut and said collet;
   a back-up member disposable into said intermediate portion of said bore; and
   on at least partly resiliently deformable retainer ring, said retainer ring including means for detachably engaging said back-up member, said retainer ring extending into said recess in said intermediate portion of said bore, whereby said collet means is retained against disengagement from said bore in one direction by mutual engagement of said tapered surfaces and in an opposite direction by engagement of said retainer ring with said nut and with said back-up member.

2. A pipe coupling according to claim 1, wherein said back-up member includes an outer periphery and said engaging means engages said back-up member at least at said outer periphery.

3. A pipe coupling according to claim 2, wherein said back-up member includes a peripheral groove along said outer periphery.

4. A pipe coupling according to claim 3, including a sealing ring disposed between said body means and the pipe, and an anti-extrusion washer disposed between said back-up member and said sealing ring, and including means for securing said anti-extrusion washer to said back-up member.

5. A pipe coupling as claimed in claim 4, wherein said deformable retainer ring is axially split to facilitate its fitting.

6. A pipe coupling as claimed in claim 4, wherein said retainer ring includes an internal rib for engagement in said peripheral groove and an outwardly extending barb portion.

7. A pipe coupling as claimed in claim 4, wherein said retainer ring comprises an annular band having an internal annular rib engaging said peripheral groove and further including a barb portion integrally joined to one axial end thereof, said barb portion being a frusto-conical annulus with the base of the annulus spaced radially outwardly of the external surface of the band.

8. A pipe coupling as claimed in claim 4, wherein said retainer ring comprises an annular band having a frusto-conical annular portion integrally joined at one of its axial ends to said band and projecting inwardly of the band so that its other axial end is engaged in said peripheral groove in the back-up member.

9. A pipe coupling as claimed in claim 4, wherein said peripheral groove in the back-up member has a generally V-shaped section.

10. A pipe coupling as claimed in claim 4, wherein said back-up member has a peripheral chamfer thereon to assist in insertion past said engaging means.

11. A pipe coupling as claimed in claim 4, wherein said peripheral groove is nearer to a collet-adjacent end of said back-up member than to a collet-remote end thereof.

12. A pipe coupling as claimed in claim 4, wherein the anti-extrusion washer includes a sleeve which is a press-fit in the back-up member.

* * * * *